(12) United States Patent
Kim et al.

(10) Patent No.: US 12,215,175 B2
(45) Date of Patent: Feb. 4, 2025

(54) UV CURABLE WATER BASED POLYELECTROLYTE COMPOSITION AND METHOD FOR PRODUCING POLYELECTROLYTE FILM USING THE COMPOSITION

(71) Applicant: Yonsei University Industry Foundation (Yonsei UIF), Seoul (KR)

(72) Inventors: Jung Hyun Kim, Seoul (KR); Chan Il Park, Seoul (KR); Young No Kim, Anyang-si (KR); So Young Bae, Seoul (KR); Min Seok Do, Seoul (KR); Jeong Min Kim, Gyeongsangnam-do (KR)

(73) Assignee: Yonsei University Industry Foundation (Yonsei UIF), Seoul (KR)

( * ) Notice: Subject to any disclaimer, the term of this patent is extended or adjusted under 35 U.S.C. 154(b) by 70 days.

(21) Appl. No.: 17/333,092

(22) Filed: May 28, 2021

(65) Prior Publication Data
US 2021/0371560 A1    Dec. 2, 2021

(30) Foreign Application Priority Data
May 29, 2020 (KR) .................. 10-2020-0064667

(51) Int. Cl.
| | |
|---|---|
| *C08F 12/30* | (2006.01) |
| *B05D 1/42* | (2006.01) |
| *C08F 2/06* | (2006.01) |
| *C08F 2/10* | (2006.01) |
| *C08F 2/46* | (2006.01) |
| *C08F 2/48* | (2006.01) |

(Continued)

(52) U.S. Cl.
CPC ............... *C08F 12/30* (2013.01); *B05D 1/42* (2013.01); *C08F 2/06* (2013.01); *C08F 2/10* (2013.01); *C08F 2/46* (2013.01); *C08F 2/48* (2013.01); *C08F 2/50* (2013.01); *C08F 112/30* (2020.02); *C08F 212/30* (2020.02); *C08F 220/325* (2020.02); *C08F 220/56* (2013.01); *B05D 3/067* (2013.01); *B05D 2201/02* (2013.01); *B05D 2203/35* (2013.01)

(58) Field of Classification Search
CPC ...... C08F 2/06; C08F 2/10; C08F 2/46; C08F 2/48; C08F 2/50; C08F 12/30; C08F 112/30; C08F 212/30
See application file for complete search history.

(56) References Cited

U.S. PATENT DOCUMENTS

| | | | |
|---|---|---|---|
| 8,008,453 B2 * | 8/2011 | Gegg | ..................... A61P 37/02<br>530/391.1 |
| 2002/0012848 A1 * | 1/2002 | Callahan | ............... H01M 12/06<br>429/534 |

(Continued)

FOREIGN PATENT DOCUMENTS

| | | | |
|---|---|---|---|
| CN | 108623727 | | 10/2018 |
| CN | 108623727 A | * | 10/2018 |
| KR | 10-2006-0092599 | | 8/2006 |

*Primary Examiner* — Ling Siu Choi
*Assistant Examiner* — David L Miller (57) ABSTRACT

The present invention relates to a UV curable water-based polyelectrolyte composition and a method for producing a polyelectrolyte film using the same, which provides a polyelectrolyte composition comprising: at least one polyelectrolyte selected from Formulas 1 to 3; an acrylate-based material; a cross-linker; a photoinitiator; and a solvent.

18 Claims, 2 Drawing Sheets

(51) Int. Cl.
*C08F 2/50* (2006.01)
*C08F 112/14* (2006.01)
*C08F 212/14* (2006.01)
*C08F 220/32* (2006.01)
*C08F 220/56* (2006.01)
*B05D 3/06* (2006.01)

(56) References Cited

U.S. PATENT DOCUMENTS

2005/0164116 A1* 7/2005 Wang ................. B01J 13/18
    430/138
2014/0151607 A1* 6/2014 Lowenthal ........... C09D 11/101
    252/514
2014/0293514 A1* 10/2014 Han ................. H01B 1/128
    524/852

* cited by examiner

UV CURABLE WATER BASED POLYELECTROLYTE COMPOSITION AND METHOD FOR PRODUCING POLYELECTROLYTE FILM USING THE COMPOSITION

RELATED APPLICATION

This application claims the benefit of priority of Korean Patent Application No. 10-2020-0064667 filed on May 29, 2020, the contents of which are incorporated herein by reference in their entirety.

FIELD AND BACKGROUND OF THE INVENTION

The present invention relates to an ultraviolet (UV) curable water-based polyelectrolyte composition and a method for producing a polyelectrolyte film using the same.

Conventionally, a polyelectrolyte was used with a sol-gel method or thermally cured to form a layer on a substrate. Conventionally, when lithium or sodium salts were used in the polyelectrolyte, the viscosity was low, so that it was impossible to coat a large area through a roll-to-roll process. In addition, since it is not a water-soluble polyelectrolyte, water cannot be used as a solvent, and thus it was not environmentally friendly.

It is an object of the present invention to provide a polyelectrolyte composition which is an environmentally friendly and capable of large-area coating, and a method for producing a polyelectrolyte film using the same.

SUMMARY OF THE INVENTION

In order to achieve the above-described object, the present invention provides a polyelectrolyte composition comprising at least one polyelectrolyte selected from the following formulas 1 to 3; an acrylate-based materials; a cross-linker; a photoinitiator; and a solvent.

[Formula 1]

[Formula 2]

[Formula 3]

In Formulas 1 to 3, n is an integer of 1 or more.

In the present invention, the polyelectrolyte may have a weight average molecular weight of 70,000 to 2,000,000.

In the present invention, the acrylate-based material may be at least one selected from the following formulas 4 and 5.

[Formula 4]

[Formula 5]

In Formula 4, n is an integer of 1 or more.

In the present invention, the cross-linker may be the following formula 6.

[Formula 6]

In Formula 6, n is an integer of 1 or more.

In the present invention, the photoinitiator may be the following formula 7.

[Formula 7]

In the present invention, the solvent may be water and at least one selected from the following formulas 8 to 14.

[Formula 8]

[Formula 9]

[Formula 10]

[Formula 11]

[Formula 12]

[Formula 13]

[Formula 14]

In Formula 11, n is an integer of 1 or more.

In the present invention, the mass ratio of the acrylate-based material:the polyelectrolyte may be 8:2 to 2:8 based on the solid content.

In the present invention, the content of the cross-linker may be 1 to 20 mol % of the acrylate-based material.

In the present invention, the content of the photoinitiator may be 0.1 to 5 mol % of the acrylate-based material.

In the present invention, the content of the solvent may be 50 to 150 mol % of the acrylate-based material.

In the present invention, the polyelectrolyte composition may be an ultraviolet curable water-based polyelectrolyte composition.

In the present invention, the polyelectrolyte composition may have a viscosity of 500 to 2,000 cP.

In the present invention, the polyelectrolyte composition may have an ionic conductivity of $1 \times 10^{-3}$ S/cm or more.

In the present invention, the polyelectrolyte composition may have transmittance of 80% or more.

In addition, the present invention provides a method for producing a polyelectrolyte film comprising steps of coating the above-described polyelectrolyte composition on a substrate; and curing the coating by irradiating it with ultraviolet rays.

In the present invention, the substrate may be a polyethylene terephthalate or glass substrate.

In the present invention, the polyelectrolyte film may have a thickness of 50 to 500 μm.

In the present invention, the polyelectrolyte film may have an area of 5×5 $cm^2$ or more.

In the present invention, the coating method may be doctor blade coating, slot die coating, or roll-to-roll coating.

In the present invention, the wavelength of the ultraviolet light source may be 300 to 400 nm; the interval between the light source and the coating may be 5 to 10 cm; the light quantity of the ultraviolet rays may be 100 mW/$cm^2$ or more; and the ultraviolet irradiation time may be 1 to 60 seconds.

Effects of Invention

The polyelectrolyte composition according to the present invention may be coated on a substrate by combining a polyelectrolyte, a material having an acrylate, a cross-linker and a photoinitiator, and cured by irradiating it with ultraviolet rays (UV). Also, since the polyelectrolyte is used, it can have a high viscosity unlike when the lithium or sodium salt has been used, and due to the high viscosity, the large-area coating is possible through a roll-to-roll process, so that an encapsulation process is unnecessary. In addition, since the water-soluble polyelectrolyte is used, water can be used as a solvent, and thus it is environmentally friendly.

DESCRIPTION OF SPECIFIC EMBODIMENTS OF THE INVENTION

Hereinafter, the present invention will be described in detail.

The polyelectrolyte composition according to the present invention may comprise a polyelectrolyte; an acrylate-based material; a cross-linker; a photoinitiator; and a solvent.

The polyelectrolyte may act as a guest polymer, which may be specifically at least one selected from the following formulas 1 to 3.

[Formula 1]

[Formula 2]

-continued

[Formula 3]

In Formulas 1 to 3, n is an integer of 1 or more. Specifically, n may be 1 to 1,000,000, 5 to 500,000, 10 to 100,000, 50 to 50,000, 100 to 30,000, 500 to 20,000, 1,000 to 10,000, or 2,000 to 7,000.

Formula 1 is a poly(4-styrenesulfonic acid) sodium salt (PSSNa), Formula 2 is poly(4-styrenesulfonic acid) (PSSA), and Formula 3 is a poly(4-styrenesulfonic acid) lithium salt (PSSLi). The polyelectrolytes of Formulas 1 to 3 are polymeric materials having a sodium ion ($Na^+$), a hydrogen ion ($H^+$) and a lithium ion ($Li^+$) as counter ions, respectively, in the sulfonic acid group of the repeating unit of styrenesulfonic acid. Among them, it is preferred that the poly(4-styrenesulfonic acid) of Formula 2 has a high ionic conductivity.

The weight average molecular weight (Mw) of the polyelectrolyte may be 70,000 to 2,000,000, 100,000 to 1,500,000, 300,000 to 1,200,000, or 500,000 to 1,000,000. The molecular weight may mean a converted value of standard polymethyl methacrylate or standard polystyrene measured by GPC (gel permeation chromatography) or the like. The higher the molecular weight is, the higher the ionic conductivity is, and thus it is preferable.

The polyelectrolyte may be provided in the form of a solution comprising a solid content. The solid content of the polyelectrolyte solution may be 1 to 50 wt %, 5 to 40 wt %, 10 to 30 wt %, 15 to 25 wt %, or 18 to 22 wt %.

The acrylate-based material may act as a host polymer, which may be specifically a single molecule and/or a polymer, having one or more acrylate groups, and more specifically, at least one selected from Formulas 4 and 5.

[Formula 4]

[Formula 5]

In Formula 4, n is an integer of 1 or more. Specifically, n may be 1 to 1,000, 2 to 700, 3 to 500, 4 to 300, or 5 to 100.

Formula 4 is poly(ethylene glycol) methacrylate, and Formula 5 is acrylamide.

The mass ratio (A:P) of the acrylate-based material (A): the polyelectrolyte (P) may be 8:2 to 2:8, 7:3 to 2:8, 6:4 to 2:8, 5:5 to 2:8, or 5:5 to 3:7, based on the solid content. The higher the ratio of the polyelectrolyte is, the higher the ionic conductivity is, and thus it is preferable.

The cross-linker may act as a host polymer, which may be specifically a single molecule and/or a polymer, having one or more acrylate groups, and more specifically, the following formula 6.

[Formula 6]

In Formula 6, n is an integer of 1 or more. Specifically, n may be 1 to 1,000, 2 to 700, 3 to 500, 4 to 300, or 5 to 100.

Formula 6 is poly(ethylene glycol) diacrylate.

The content of the cross-linker may be 1 to 20 mol %, 2 to 18 mol %, 4 to 16 mol %, 6 to 14 mol %, or 8 to 12 mol % of the acrylate-based material.

The photoinitiator is a material that forms radicals upon UV irradiation, which may be specifically the following formula 7.

[Formula 7]

Formula 7 is 1-hydroxy-cyclohexyl-phenyl-ketone.

The content of the photoinitiator may be 0.1 to 5 mol %, 0.2 to 4 mol %, 0.4 to 3 mol %, 0.6 to 2 mol %, or 0.8 to 1.2 mol % of the acrylate-based material.

The solvent may be water, an organic solvent and/or an ionic liquid, and the like, which may be specifically at least one selected from the following formulas 8 to 14 and water.

[Formula 8]

[Formula 9]

[Formula 10]

[Formula 11]

[Formula 12]

[Formula 13]

[Formula 14]

In Formula 11, n is an integer of 1 or more. Specifically, n may be 1 to 100,000, 10 to 80,000, 50 to 60,000, 100 to 40,000, or 200 to 30,000.

Formula 8 is dimethyl sulfoxide, Formula 9 is ethylene glycol, Formula 10 is glycerol, Formula 11 is poly(ethylene oxide), Formula 12 is 1-ethyl-3-methylimidazolium 1,1,2, 2-tetrafluoroethanesulfonate, Formula 13 is 1-butyl-3-methylimidazolium tetrafluoroborate, and Formula 14 is 1-allyl-3-methylimidazolium dicyanamide.

The content of the solvent may be 50 to 150 mol %, 60 to 140 mol %, 70 to 130 mol %, 80 to 120 mol %, or 90 to 110 mol % of the acrylate-based material. Also, the content of the solvent may be the same as the content of the acrylate-based material.

The polyelectrolyte composition according to the present invention may be an ultraviolet curable water-based polyelectrolyte composition. By irradiating the UV curable electrolyte light in the UV region, the liquid electrolyte solution can be changed into a solid phase. The reason why the polyelectrolyte is water-based (water-soluble) is because polystyrene ends are sulfonated.

Figure 1:
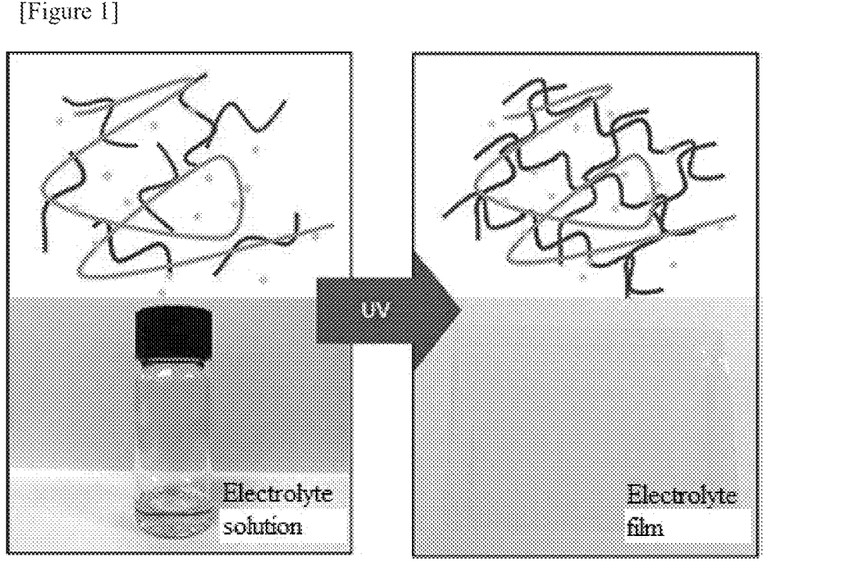
FIG. 1 shows the UV curing process of the polyelectrolyte composition according to the present invention.

FIG. 1 shows the UV curing process of the polyelectrolyte composition according to the present invention, wherein the green line represents the polyelectrolyte, the blue line represents the cross-linker, the red line represents the acrylate-based material, and the yellow dot represents $H^+$, $Li^+$ or $Na^+$.

The viscosity of the polyelectrolyte composition may be 500 to 2,000 cP, 700 to 1,900 cP, 800 to 1,800 cP, 900 to 1,700 cP, or 1,000 to 1,600 cP. The viscosity can be measured at 25° C. using a BROOKFIELD DV2T Viscometer or the like. In the present invention, it may have a high viscosity by using a polyelectrolyte.

The ionic conductivity of the polyelectrolyte composition may be $1 \times 10^{-3}$ S/cm or more, specifically, $1 \times 10^{-3}$ to $1 \times 10^{-1}$ S/cm, $2 \times 10^{-3}$ to $8 \times 10^{-2}$ S/cm, $3 \times 10^{-3}$ to $6 \times 10^{-2}$ S/cm, $4 \times 10^{-3}$ to $4 \times 10^{-2}$ S/cm, or $5 \times 10^{-3}$ to $2 \times 10^{-2}$ S/cm. The ionic conductivity can be measured using a potentiostat or the like.

The transmittance of the polyelectrolyte composition may be 80% or more, specifically 80 to 100%, 80 to 98%, 80 to 96%, 80 to 94%, 80 to 92%, or 80 to 90% in the ultraviolet and visible light regions. The transmittance may be measured using UV-vis-NIR spectrophotometry or the like.

In addition, the present invention provides a method for producing a polyelectrolyte film comprising steps of coating the above-described polyelectrolyte composition on a substrate; and curing the coating by irradiating it with ultraviolet rays.

The substrate may be a polyethylene terephthalate (PET) substrate or a glass substrate.

The thickness of the polyelectrolyte film (dried after curing) may be 50 to 500 μm, 60 to 400 μm, 70 to 350 μm, 80 to 300 μm, 90 to 250 μm, or 100 to 200 μm.

The thickness of the coating layer (wet before curing) may be 50 to 650 μm, 100 to 600 μm, 150 to 550 μm, 200 to 500 μm, 250 to 450 μm, or 300 to 400 μm.

The area of the polyelectrolyte film may be 5×5 cm² or more, specifically 5×5 to 1,000×1,000 cm², 10×10 to 500×1,000 cm², 20×20 to 100×1,000 cm², or 20×20 to 20×1,000 cm². In the case of a large area such as 20×1,000 cm², it may be formed using a roll-to-roll coating method.

The coating method may be a doctor blade coating method, a slot die coating method or a roll-to-roll coating method, and the like.

As the ultraviolet light source, a UV LED or the like may be used. The wavelength of the ultraviolet light source may be 300 to 400 nm, 310 to 395 nm, 320 to 390 nm, 330 to 385 nm, 340 to 380 nm, 350 to 375 nm, or 360 to 370 nm.

The distance between the ultraviolet light source and the coating layer may be 5 to 10 cm, 5.5 to 9.5 cm, 6 to 9 cm, 6.5 to 8.5 cm, or 7 to 8 cm.

The light quantity of the ultraviolet rays may be 100 mW/cm² or more (based on powerpuck ll), specifically 100 to 1,000 mW/cm², 120 to 900 mW/cm², 140 to 800 mW/cm², 160 to 700 mW/cm², 180 to 600 mW/cm², or 200 to 500 mW/cm².

The irradiation time of the ultraviolet rays may be 1 to 60 seconds, 3 to 50 seconds, 5 to 40 seconds, 7 to 30 seconds, or 10 to 20 seconds.

The present invention relates to a UV curable water-based polyelectrolyte composition and a method for producing an electrolyte film. By using a host polymer that can impart mechanical properties and a guest polymer that acts as a hydrogen ion donor, the UV curable water-based polyelectrolyte composition is a water-based type electrolyte composition dispersed in an aqueous solution instead of an organic solvent, which is capable of UV curing. The host polymer means an acrylate-based material and a cross-linker that are bound by UV and a photoinitiator to form a solid form (matrix). The guest polymer means a polyelectrolyte that provides the ionic conductivity.

The water-based type electrolyte does not use an organic solvent, thereby being environmentally friendly, and can optimize the concentration of hydrogen cations by using a polyelectrolyte. Specifically, depending on the desired application field, the mass ratio of solid contents of the acrylate-based material and the polyelectrolyte (for example, 5:5, 4:6 or 3:7) can be selectively adjusted to increase the cation concentration in the electrolyte relative to the total amount. Also, in order to optimize the hydrogen cation concentration, a water-soluble salt such as sulfates or lithium salts may also be additionally added.

Figure 2:
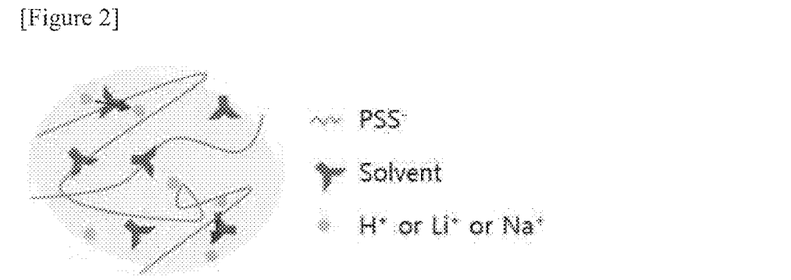
FIG. 2 shows the ion migration path provided by the solvent in the present invention.

The electrolyte can increase the mobility of cations in the polyelectrolyte while maintaining the transparency of the electrolyte by adding a solvent. Specifically, the solvents exemplified above can maintain transparency because they mix well with the water-soluble polyelectrolyte, and the solvents with relatively small molecules penetrate into the host polymer (matrix) to reduce the movement distance of cations, so that the mobility may increase. In this regard, FIG. 2 shows the ion migration path provided by the solvent in the present invention.

In addition, due to the high viscosity of the polyelectrolyte and the short curing time of the UV curable host polymer, the large area coating is possible without any encapsulation process. Specifically, when —CH$_3$ is attached to the double bond carbon of acrylate, the radical is stabilized and the reaction rate is slow, but in the case of acrylamide, the curing time may be shortened because —CH$_3$ does not exist in the double bond where the photoreaction proceeds.

Hereinafter, the present invention will be described in more detail with reference to Example and Experimental Example.

Example

A polyelectrolyte composition comprising a polyelectrolyte, an acrylate-based material, a cross-linker, a photoinitiator and a solvent was prepared.

As the polyelectrolyte, poly(4-styrenesulfonic acid) sodium salt (PSSNa, Formula 1) or poly(4-styrenesulfonic acid) (PSSA, Formula 2) was used. The weight average molecular weight (Mw) of the polyelectrolyte was 500,000 or 1,000,000. The polyelectrolyte was in the form of a solution containing a solid content of 20 wt %.

As the acrylate-based material, poly(ethylene glycol) methacrylate (Formula 4) or acrylamide (Formula 5) was used. The mass ratio (A:P) of the acrylate-based material (A): the polyelectrolyte (P) was 7:3, 6:4 or 5:5, based on the solid content.

As the cross-linker, poly(ethylene glycol) diacrylate (Formula 6) was used. The content of the cross-linker was 10 mol % of the acrylate-based material.

As the photoinitiator, 1-hydroxy-cyclohexyl-phenyl-ketone (Formula 7) was used. The content of the photoinitiator was 1 mol % of the acrylate-based material.

As the solvent, water, dimethyl sulfoxide (Formula 8), ethylene glycol (Formula 9), glycerol (Formula 10), poly(ethylene oxide) (Formula 11), 1-ethyl-3-methylimidazolium 1,1,2,2-tetrafluoroethanesulfonate (Formula 12), 1-butyl-3-methylimidazolium tetrafluoroborate (Formula 13), and/or 1-allyl-3-methylimidazolium dicyanamide (Formula 14) was used. The content of the solvent was the same as the content of the acrylate-based material.

The prepared polyelectrolyte composition had a viscosity of 1,000 to 1,600 cP, where the viscosity was measured at 25° C. using a BROOKFIELD DV2T Viscometer.

Thereafter, the prepared polyelectrolyte composition was coated on a substrate, and then irradiated with ultraviolet rays to cure the coating layer, thereby producing a polyelectrolyte film.

The substrate was a PET substrate or a glass substrate. The thickness of the coating layer was 300 to 400 μm. The thickness of the polyelectrolyte film was 100 to 200 μm. The area of the polyelectrolyte film was 5×5 cm$^2$, 10×10 cm$^2$, 20×20 cm$^2$, or 20×1,000 cm$^2$. The coating method was a doctor blade coating, slot die coating, or roll-to-roll coating method. The ultraviolet light source was a UV LED. The wavelength of the ultraviolet light source was 365 nm. The distance between the ultraviolet light source and the coating layer was 7.5 cm. The light quantity of the ultraviolet rays was 200 mW/cm$^2$ or more (based on powerpuck 11). The irradiation time of the ultraviolet rays was 10 to 20 seconds.

Experimental Example

1. Transmittance

A method of preparing a sample for measuring transmittance was as follows.

1) A PET film (5 cm×5 cm) having a thickness of 100 μm was prepared.

2) The electrolyte composition was coated on PET to a thickness of 300 μm using a doctor blade (coating speed: 10 mm/sec).

3) It was irradiated with UV for 10 seconds using a UV irradiation device (Lim Tech Co., Ltd. LGA-15200F, used at a UV LED intensity of 200 mW/cm$^2$ with a power of 20%), and cured (electrolyte film thickness after curing: 150 μm).

4) The transmittance was measured using UV-vis-NIR spectrophotometry (JASCO Corporation, V-650) (wavelength range: 200 nm to 1,100 nm).

Figure 3:
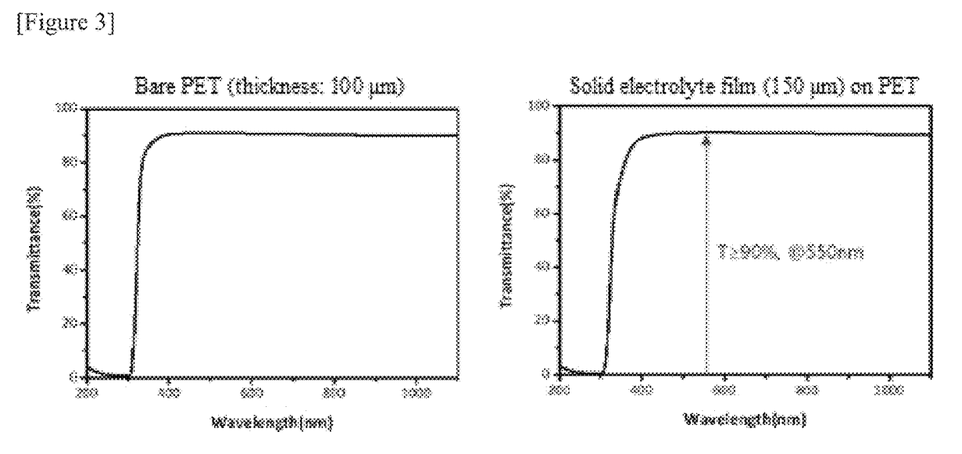
FIG. 3 is a view comparing the transmittance of the polyelectrolyte film according to the present invention with that of a bare substrate.

FIG. 3 is a view comparing the transmittance of the polyelectrolyte film according to the present invention with that of a bare substrate, where the polyelectrolyte film according to the present invention showed high transmittance in the UV-Visible regions (>80%). In particular, in the 550 nm wavelength band, it exhibited transmittance of 90% or more, including the PET base material.

2. Ionic Conductivity

The ionic conductivity measurement and calculation method was as follows.

1) A test piece was visually inspected before the test.
2) Nickel electrodes were attached above and below to connect the test piece to a potentiostat.
3) The bulk resistance was measured using the test equipment.
4) The thickness of the electrolyte film was measured using a micrometer.

Table 1 shows the details of the test equipment used.

TABLE 1

| Device name | Manufacturer | Model name |
| --- | --- | --- |
| Potentiostat | AVANTES | PARSTAT MULTICHANNEL (PMC) CHASSIS PMC CHANNEL AC/DC +/−12 VOLTS, +/− |

The ionic conductivity was measured at room temperature and about 60% relative humidity. The ionic conductivity of the electrolyte film was calculated using the following equation.

$$\text{Ionic Conductivity of Electrolyte Film} = (L/A) \times (1/R) \quad \text{[Equation 1]}$$

In Equation 1, L is the thickness of the electrolyte film, A is the area of the electrolyte film, and R is the bulk resistance of the electrolyte film.

As a result of measuring the ionic conductivity, there was no significant difference from the ionic conductivity of the liquid phase even after UV curing.

Table 2 shows the ionic conductivity of the polyelectrolyte composition (liquid phase) according to the type of the polyelectrolyte, where the ionic conductivity was higher when the counter ion of PSS at the same molecular weight was H$^+$ than when it was Na$^+$.

TABLE 2

| Polyelectrolyte type | Ionic conductivity (S/cm) |
| --- | --- |
| PSSNa (Mw 1,000,000) | 7.56 × 10$^{-3}$ |
| PSSA (Mw 1,000,000) | 1.04 × 10$^{-2}$ |

Table 3 shows the ionic conductivity of the UV curable electrolyte composition according to the ratio of the acrylate-based material and the polyelectrolyte, where in the electrolyte after curing, the higher the ratio of the polyelectrolyte was, the higher the ionic conductivity was.

TABLE 3

| Solid content ratio of acrylate-based material:polyelectrolyte (PSSA) (wt ratio) | Ionic conductivity (S/cm) |
|---|---|
| 7:3 | $9.9 \times 10^{-3}$ |
| 6:4 | $1.3 \times 10^{-2}$ |
| 5:5 | $1.6 \times 10^{-2}$ |

Table 4 shows the ionic conductivity according to the molecular weight of the polyelectrolyte (based on the ratio of acrylate-based material:PSSA=7:3), where the higher the molecular weight of the polyelectrolyte was, the longer the path through which cations could move at once was, so that the ionic conductivity was high.

TABLE 4

| Molecular weight of polyelectrolyte | Ionic conductivity (S/cm) |
|---|---|
| PSSA (Mw 500,000) | $5.5 \times 10^{-3}$ |
| PSSA (Mw 1,000,000) | $9.9 \times 10^{-3}$ |

What is claimed is:

1. A polyelectrolyte composition comprising at least one polyelectrolyte selected from the following Formulae 1 to 3:

[Formula 1]

[Formula 2]

[Formula 3]

an acrylate-based material of the following Formula 4:

[Formula 4]

a cross-linker;
a photoinitiator; and
a solvent,
wherein;
for each of Formulae 1 to 4 independently, n is an integer of 1 or more,
a mass ratio of said acrylate-based material to said at least one polyelectrolyte ranges 8:2 to 2:8 based on a solid content thereof.

2. The polyelectrolyte composition according to claim 1, wherein said at least one polyelectrolyte is characterized by a weight average molecular weight ranging from 70,000 to 2,000,000 g/mol.

3. The polyelectrolyte composition according to claim 1, wherein the cross-linker is the following formula 6:

[Formula 6]

wherein, n is an integer of 1 or more.

4. The polyelectrolyte composition according to claim 1, wherein the photoinitiator is the following Formula 7:

[Formula 7]

5. The polyelectrolyte composition according to claim 1, wherein the solvent is at least one selected from the group consisting of water and the following Formulae 8 to 14:

[Formula 8]

[Formula 9]
HOCH$_2$CH$_2$OH

[Formula 10]

[Formula 11]

-continued

[Formula 12]

[Formula 13]

[Formula 14]

wherein, n is an integer of 1 or more.

6. The polyelectrolyte composition according to claim 1, wherein the content of the cross-linker is 1 to 20 mol % of the acrylate-based material.

7. The polyelectrolyte composition according to claim 1, wherein the content of the photoinitiator is 0.1 to 5 mol % of the acrylate-based material.

8. The polyelectrolyte composition according to claim 1, wherein the content of the solvent is 50 to 150 mol % of the acrylate-based material.

9. The polyelectrolyte composition according to claim 1, wherein the polyelectrolyte composition is an ultraviolet curable water-soluble polyelectrolyte composition.

10. The polyelectrolyte composition according to claim 1, wherein the polyelectrolyte composition has a viscosity of 500 to 2,000 cP, as measured using a viscometer at 25° C.

11. The polyelectrolyte composition according to claim 1, wherein the polyelectrolyte composition has an ionic conductivity of $1 \times 10^{-3}$ S/cm or more, and the ionic conductivity is measured at room temperature and 60% relative humidity using a potentiostat.

12. The polyelectrolyte composition according to claim 1, wherein a film formed by curing the polyelectrolyte composition has transmittance of 80% or more, as measured in a 150 μm thick film using a UV-vis-NIR spectrophotometer.

13. A method for producing a polyelectrolyte film comprising steps of:
coating the polyelectrolyte composition according to claim 1 on a substrate; and
curing the coating by irradiating it with ultraviolet rays.

14. The method for producing a polyelectrolyte film according to claim 13, wherein the substrate is a polyethylene terephthalate or glass substrate.

15. The method for producing a polyelectrolyte film according to claim 13, wherein the polyelectrolyte film has a thickness of 50 to 500 μm.

16. The method for producing a polyelectrolyte film according to claim 13, wherein the polyelectrolyte film has an area of 5×5 cm² or more.

17. The method for producing a polyelectrolyte film according to claim 13, wherein the coating method is doctor blade coating, slot die coating or roll-to-roll coating.

18. The method for producing a polyelectrolyte film according to claim 13, wherein the wavelength of the ultraviolet light source is 300 to 400 nm; the interval between the light source and the coating is 5 to 10 cm; the light quantity of the ultraviolet rays is 100 mW/cm² or more; and the ultraviolet irradiation time is 1 to 60 seconds.

* * * * *